(12) United States Patent
Zhou et al.

(10) Patent No.: US 10,726,239 B2
(45) Date of Patent: Jul. 28, 2020

(54) DISPLAY PANEL AND DISPLAY DEVICE

(71) Applicant: Shanghai Tianma AM-OLED Co., Ltd., Shanghai (CN)

(72) Inventors: Xingyao Zhou, Shanghai (CN); Yana Gao, Shanghai (CN); Yue Li, Shanghai (CN); Dongxu Xiang, Shanghai (CN); Yuan Li, Shanghai (CN); Renyuan Zhu, Shanghai (CN)

(73) Assignee: SHANGHAI TIANMA AM-OLED CO., LTD., Shanghai (CN)

( * ) Notice: Subject to any disclaimer, the term of this patent is extended or adjusted under 35 U.S.C. 154(b) by 78 days.

(21) Appl. No.: 16/166,376

(22) Filed: Oct. 22, 2018

(65) Prior Publication Data

US 2019/0332842 A1 Oct. 31, 2019

(30) Foreign Application Priority Data

Apr. 27, 2018 (CN) .......................... 2018 1 0392188

(51) Int. Cl.
*G06K 9/00* (2006.01)
*G06F 3/041* (2006.01)
(Continued)

(52) U.S. Cl.
CPC ......... *G06K 9/0004* (2013.01); *G06F 3/0412* (2013.01); *G06F 21/32* (2013.01);
(Continued)

(58) Field of Classification Search
CPC .......... G06K 9/0004; G06K 2009/0006; H01L 51/0097; H01L 2251/5338; G06F 1/1652; G06F 2203/04102; G09F 9/301; G09G 2380/02; H05K 1/028; H04M 1/0268; G02F 1/133305
See application file for complete search history.

(56) References Cited

U.S. PATENT DOCUMENTS

2018/0331163 A1* 11/2018 Yang ........................ G09F 21/10
2019/0067408 A1* 2/2019 Sun ........................ G06K 9/0002
(Continued)

FOREIGN PATENT DOCUMENTS

CN 107564416 A 1/2018

*Primary Examiner* — Koosha Sharifi-Tafreshi
(74) *Attorney, Agent, or Firm* — Anova Law Group PLLC (57) ABSTRACT

A display panel includes a base substrate, including a display region and a non-display region; a pixel array in the display region; and at least one fingerprint recognition unit, located on the base substrate in the non-display region. Each fingerprint recognition unit includes a fingerprint recognition sensor, including a first electrode layer, a P-type-semiconductor/insulator/N-type-semiconductor (PIN) layer, and a second electrode layer. The first electrode layer includes a transparent electrode material. The non-display region includes a step bending region, and a fingerprint recognition region located on the side of the step bending region away from the display region. The at least one fingerprint recognition unit is located in the fingerprint recognition region. The display panel is folded at the step bending region. The first electrode layer of each fingerprint recognition unit is located on the side surface of the PIN layer close to the light-emitting surface of the display panel.

20 Claims, 10 Drawing Sheets

(51) Int. Cl.
  *G06F 21/32* (2013.01)
  *H01L 27/32* (2006.01)
  *H01L 31/105* (2006.01)

(52) U.S. Cl.
  CPC ...... *G06K 9/00087* (2013.01); *H01L 27/3248* (2013.01); *H01L 27/3276* (2013.01); *H01L 31/105* (2013.01)

(56) References Cited

U.S. PATENT DOCUMENTS

2019/0272407 A1* 9/2019 Park .................... H01L 27/3234
2019/0296266 A1* 9/2019 Kim ........................ H01L 27/32

* cited by examiner

DISPLAY PANEL AND DISPLAY DEVICE

CROSS-REFERENCES TO RELATED APPLICATIONS

This application claims the priority of Chinese patent application No. 201810392188.7, filed on Apr. 27, 2018, the entirety of which is incorporated herein by reference.

FIELD OF THE DISCLOSURE

The present disclosure generally relates to the field of display technology and, more particularly, relates to a display panel and a display device.

BACKGROUND

Human fingerprints are unique and non-deformable, making fingerprint recognition more secure. In the meantime, because the operation is simple, fingerprint recognition has been widely used in various fields, including the field of display technology. In the field of display technology, taking mobile phone as an example, fingerprint recognition may be performed to unlock the mobile phone or start a specific application (APP).

With the development of technology, a variety of display devices with fingerprint recognition functions, such as mobile phones, tablet computers, smart wearable devices, etc. have appeared on the market. As such, before a user operates a display device with a fingerprint recognition function, the user may only need to touch the fingerprint recognition module of the display device using a finger to initiate authority verification. Therefore, the authority verification process may be simplified. For display devices integrated with fingerprint recognition functions, how to reduce the costs and continuously improve the experience becomes a common problem that the industry faces.

The disclosed display panel and display device are directed to solve one or more problems set forth above and other problems in the art.

BRIEF SUMMARY OF THE DISCLOSURE

One aspect of the present disclosure provides a display panel. The display panel includes a base substrate, including a display region and a non-display region; a pixel array, disposed in the display region; and at least one fingerprint recognition unit, located in the non-display region and sharing the base substrate with the pixel array. Each fingerprint recognition unit includes a fingerprint recognition sensor, and the fingerprint recognition sensor includes a first electrode layer, a P-type-semiconductor/insulator/N-type-semiconductor (PIN) layer, and a second electrode layer disposed in a sequential order. The first electrode layer includes a transparent electrode material. The non-display region includes a step bending region and a fingerprint recognition region. The fingerprint recognition region is located on the side of the step bending region away from the display region, and the at least one fingerprint recognition unit is located in the fingerprint recognition region. The display panel is folded at the step bending region. After the display panel is folded, the first electrode layer of each fingerprint recognition unit is located on the side surface of the PIN layer close to the light-emitting surface of the display panel, and the folding direction of the display panel is opposite to the light-emitting direction of the display panel.

Another aspect of the present disclosure provides a display device. The display device includes a display panel. The display panel includes a base substrate, including a display region and a non-display region; a pixel array, disposed in the display region; and at least one fingerprint recognition unit, located in the non-display region and sharing the base substrate with the pixel array. Each fingerprint recognition unit includes a fingerprint recognition sensor, and the fingerprint recognition sensor includes a first electrode layer, a P-type-semiconductor/insulator/N-type-semiconductor (PIN) layer, and a second electrode layer disposed in a sequential order. The first electrode layer includes a transparent electrode material. The non-display region includes a step bending region and a fingerprint recognition region. The fingerprint recognition region is located on the side of the step bending region away from the display region, and the at least one fingerprint recognition unit is located in the fingerprint recognition region. The display panel is folded at the step bending region. After the display panel is folded, the first electrode layer of each fingerprint recognition unit is located on the side surface of the PIN layer close to the light-emitting surface of the display panel, and the folding direction of the display panel is opposite to the light-emitting direction of the display panel.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. It should be noted that certain terms are used throughout the description and claims to refer to specific components. Those skilled in the art should understand that hardware manufacturers may use different terms for the same component. The present specification and claims do not use the differences in the names as the means for distinguishing the components, instead, the differences in the functions of the components are used as the criteria for distinguishing the components. The word "comprising" as used throughout the specification and claims is an open expression and should be interpreted as "including but not limited to". The word "substantially" means that within an acceptable tolerance range, those skilled in the art should be able to solve the technical problem within a certain tolerance and achieve basically equivalent technical results. In addition, the term "coupled" is used herein to include any means of direct or indirect electrical coupling. Therefore, when a first device is coupled to a second device, the first device can be electrically coupled to the second device in a direct manner, or can be electrically coupled to the second device through other devices or in an indirect manner of coupling. The following descriptions of the specification of the present disclosure illustrate various preferred embodiments of the present disclosure. However, the description is intended to be illustrative of the general principles of the application, rather than to limit the scope of the application. The scope of protection of the application should be subject to the description of the appended claims.

Figure 1:
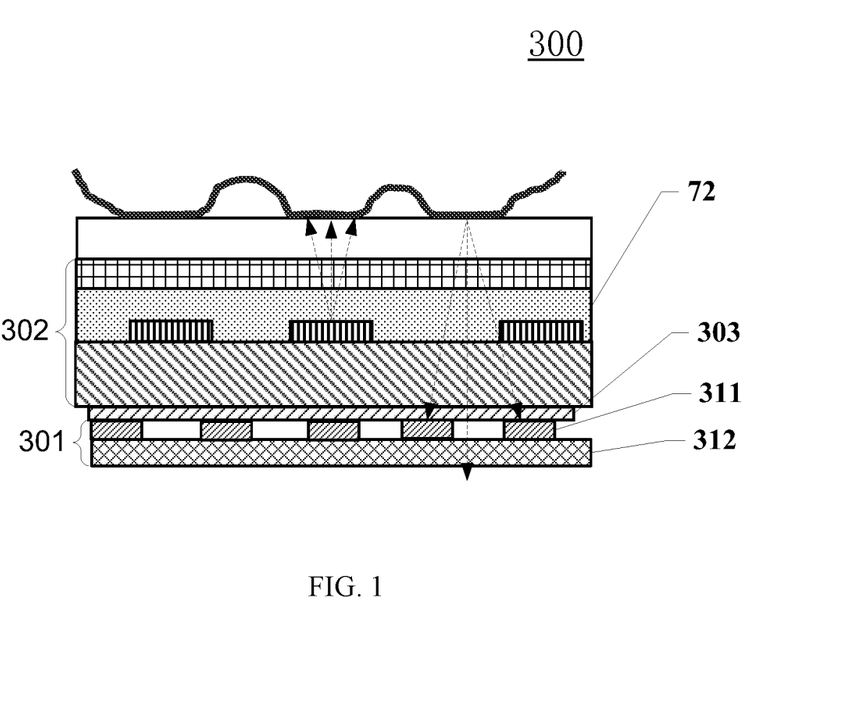
FIG. 1 illustrates a schematic cross-sectional view of a display panel with a fingerprint recognition function.

FIG. 1 illustrates a schematic cross-sectional view of a display panel with a fingerprint recognition function. Referring to FIG. 1, in a display panel 300 with an under-screen fingerprint recognition function, a fingerprint recognition module 301 and an organic light-emitting diode (OLED) module 302 are two independent structures. The fingerprint recognition module 301 includes a fingerprint recognition sensor 311 and a separate control circuit. After the fingerprint recognition module 301 and the OLED module 302 are separately formed, the fingerprint recognition module 301 is usually pasted on the back-side surface (i.e., the side surface that is opposite to the light-emitting surface) of the OLED module 302 through an optical adhesive 303. However, the display panel 300 formed by the structure shown in FIG. 1 contains a large number of components, and thus the production cost of the display panel may be high.

The present disclosure provides a display panel and a display device with fingerprint recognition functions. The fingerprint recognition unit in the disclosed display panel and display device shares a same base substrate with the pixel array. Therefore, while having the fingerprint recognition function, the display panel and the display device may include less components, and thus the production cost and the weight of the display panel and the display device may be reduced.

In the following, various exemplary embodiments will be provided to illustrate the disclosed display panel and display device.

Figure 2:
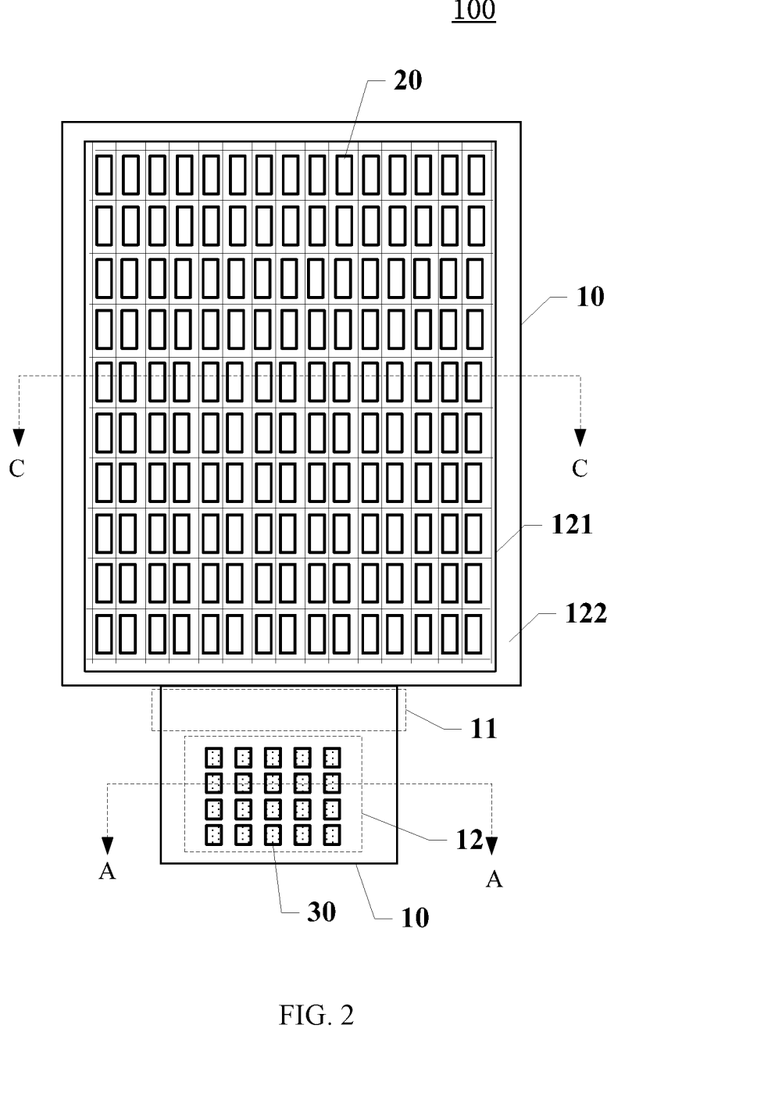
FIG. 2 illustrates a schematic top view of an exemplary display panel before being folded according to some embodiments of the present disclosure.
Figure 3:
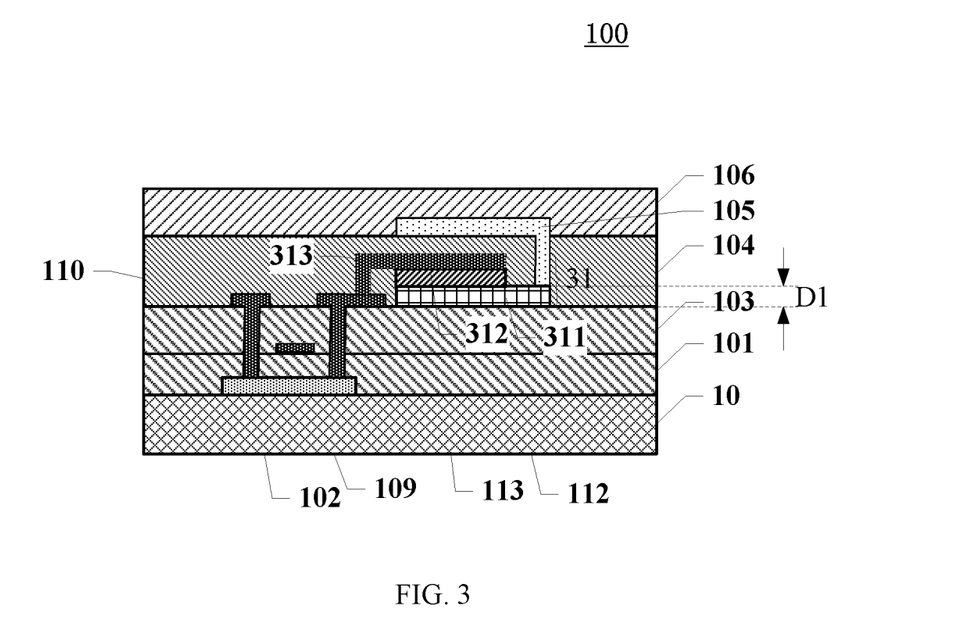
FIG. 3 illustrates a schematic cross-sectional view of a fingerprint recognition unit of the display panel shown in FIG. 2 in an A-A direction.
Figure 4:
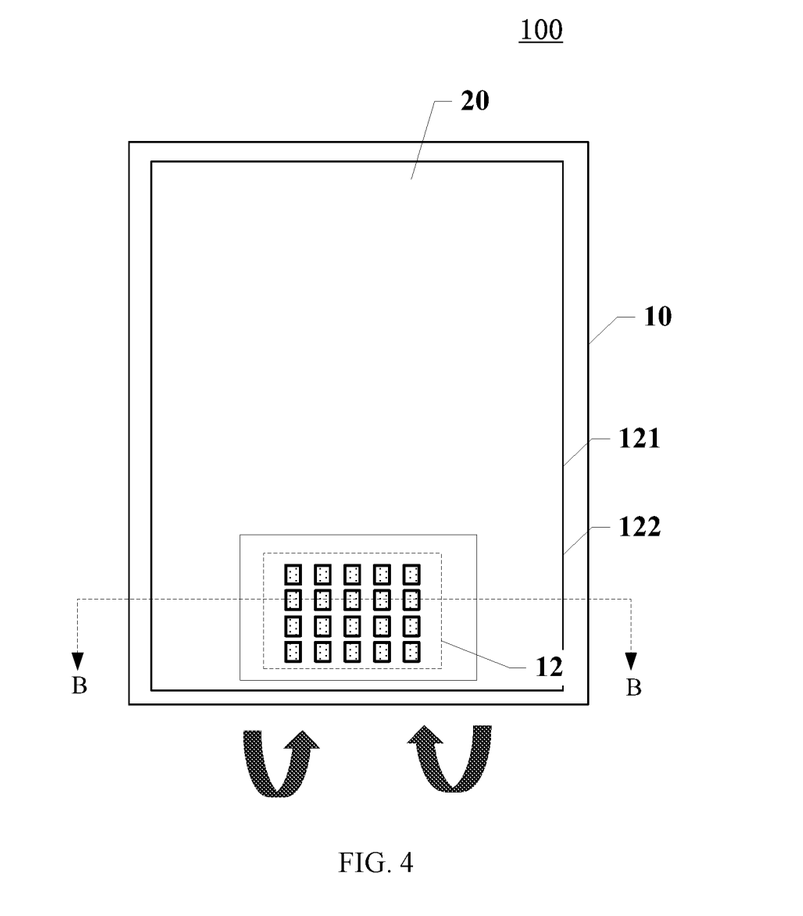
FIG. 4 illustrates a schematic view of an exemplary display panel from the back-side surface of the display panel after being folded according to some embodiments of the present disclosure.

The present disclosure provides a display panel. FIG. 2 illustrates a schematic top view of an exemplary display panel before being folded according to some embodiments of the present disclosure. FIG. 3 illustrates a schematic cross-sectional view of a fingerprint recognition unit of the display panel shown in FIG. 2 along an A-A direction. FIG. 4 illustrates a schematic view of the exemplary display panel from the back-side surface of the display panel after being folded according to some embodiments of the present disclosure.

Referring to FIGS. 2-4, the present disclosure provides a display panel 100. The display panel 100 may include a base substrate 10 including a display region 121 and a non-display region 122. The display panel 100 may also include a pixel array 20 located in the display region 121, and at least one fingerprint recognition unit 30.

Referring to FIGS. 2-3, the fingerprint recognition unit 30 may be located in the non-display region 122, and may share the base substrate 10 with the pixel array 20. The fingerprint recognition unit 30 may include a fingerprint recognition sensor 31, and the fingerprint recognition sensor 31 may further include a first electrode layer 311, a P-type-semiconductor/insulator/N-type-semiconductor (PIN) layer 312, and a second electrode layer 313 that are disposed in a sequential order. The first electrode layer 311 may include a transparent electrode material.

Referring to FIG. 2, the non-display region 122 may include a step bending region 11 and a fingerprint recognition region 12. The fingerprint recognition region 12 may be located at the side of the step bending region 11 that is away from the display region 121. The fingerprint recognition region 12 may include at least one fingerprint recognition unit 30.

After the display panel 100 is folded at the step bending region 11, the first electrode layer 311 of the fingerprint recognition unit 30 may be located at the side surface of the PIN layer 312 that is close to the light-emitting surface of the display panel 100. The folding direction of the display panel 100 may be opposite to the light-emitting direction of the display panel 100. That is, the fingerprint recognition region 12 may be folded to the back-side surface of the display panel 100 that is opposite to the light-emitting surface.

For example, referring to FIG. 2, on the basis of a conventional display panel 100, the base substrate 10 may be partially extended, and a step bending region 11 and a fingerprint recognition region 12 may be formed on the extended portion of the base substrate 10. In practical applications, the display panel 100 may be folded at the step bending region 11. Referring to FIG. 4, the fingerprint recognition region 12 may be folded to the back-side surface of the display panel 100 (i.e., the side surface of the display panel 100 that is away from the light-emitting surface). The arrows in FIG. 4 schematically indicate that the fingerprint recognition region 12 is folded to the back-side surface of the display panel 100. According to the disclosed display panel, the fingerprint recognition unit 30 in the fingerprint recognition region 12 and the pixel array 20 in the display region 121 may share a same base substrate 10. That is, the fingerprint recognition unit 30 may be integrated in relevant film structures formed on the base substrate 10, and separately setting a corresponding module for the fingerprint recognition unit 30 may not be necessary. Therefore, while the display panel 100 has the fingerprint recognition function, the number of components included in the display panel 100 may be reduced, which may be conducive to reducing the production cost and the weight of the display panel.

In addition, in practical applications, referring to FIG. 4, the fingerprint recognition unit 30 may be folded to the side surface of the display panel 100 that is opposite to the light-emitting surface. Therefore, even the pixel array 20 and the fingerprint recognition unit 30 share the base substrate 10, the width of the frame of the display panel 100 may not increase. The method of folding the fingerprint recognition unit 30 to the back-side surface of the display panel 100 may be conducive to reducing the frame width of the display panel 100, such that the narrow frame design may be implemented.

Figure 5:
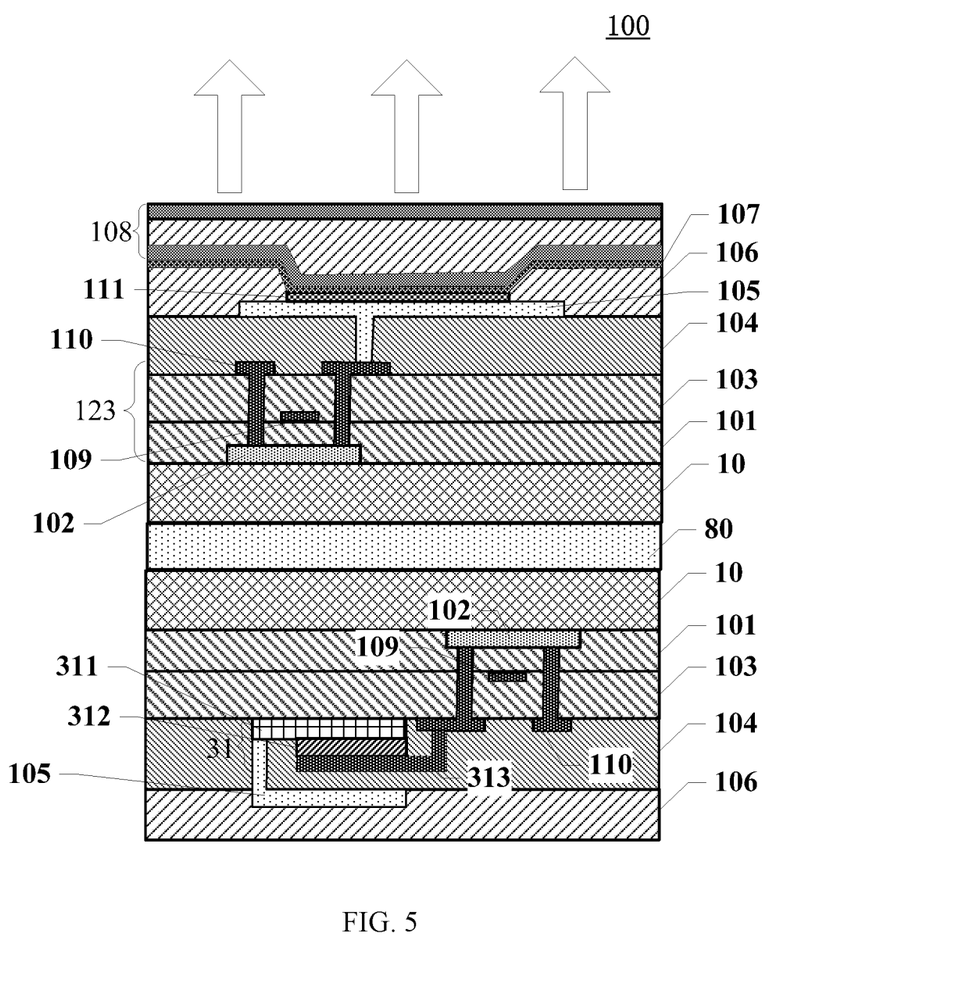
FIG. 5 illustrates a schematic cross-sectional view of a pixel region and a corresponding fingerprint recognition unit in the display panel shown in FIG. 4 along a B-B direction.

Moreover, FIG. 3 illustrates a cross-sectional view of the fingerprint recognition unit 30 before being folded, and FIG. 5 illustrates a schematic cross-sectional view of a pixel region and the corresponding fingerprint recognition unit in the display panel shown in FIG. 4 along a B-B direction. The arrows in FIG. 5 indicate the light-emitting direction of the display panel. Referring to FIG. 3 and FIG. 5, the fingerprint region 12 may be folded to the back-side surface of the display panel 100. The first electrode layer 311 of the fingerprint recognition sensor 31 may be close to the light-emitting surface of the display panel with respect to the PIN layer 312, and the light reflected by the touch object may enter the PIN layer 312 through the first electrode layer 311 to realize the fingerprint recognition function.

In one embodiment, the material used for making the first electrode layer 311 of the fingerprint recognition unit 30 may be designed as a transparent electrode material, such that the transmittance of light reflected by the touch object may be increased. Therefore, more light may enter the fingerprint recognition sensor 31 from the first electrode layer 311, improving the effective utilization of the light. The design may make it easier for the fingerprint recognition sensor 31 to receive optical signals, and may thus be conducive to improving the fingerprint recognition sensitivity and the fingerprint recognition efficiency.

It should be noted that the embodiment shown in FIG. 2 only schematically illustrates the number and size of the pixel arrays 20 and the number and size of the fingerprint recognition units 30, and these numbers and sizes do not represent the actual numbers and sizes in practical applications. The actual numbers and sizes may be determined based on the actual production processes.

In one embodiment, referring to FIG. 3, the thickness of the first electrode layer 311 in the fingerprint recognition sensor 31 provided by the present disclosure may be D1, and D1 may be in a range of approximately 100 nm to 200 nm. Setting the thickness of the first electrode layer 311 to be in the range of approximately 100 nm to 200 nm may be able to ensure that the resistance corresponding to the first electrode layer 311 is sufficiently small to generate a uniform voltage. In addition, the thickness design may also be conducive to ensuring the feasibility of the process.

In one embodiment, referring to FIG. 3, the first electrode layer 311 may include indium tin oxide. Indium tin oxide is a nano-scaled metal oxide of indium tin with desired electrical conductivity and transparency. According to the embodiment of the present disclosure, the first electrode layer 311 of the fingerprint recognition unit 30 in the display panel may be a transparent conductive film made of indium tin oxide, and the light transmittance of the first electrode layer 311 may reach 90% or more. When the light reflected by the touch object reaches the first electrode layer 311, most of the light may be able to pass through the first electrode layer 311 and reach the PIN layer 312, such that the loss of the light may be suppressed and the utilization of the light may be improved. For a same fingerprint recognition sensor 31, the more light received by the PIN layer 312, the better the fingerprint recognition sensitivity.

Figure 6:
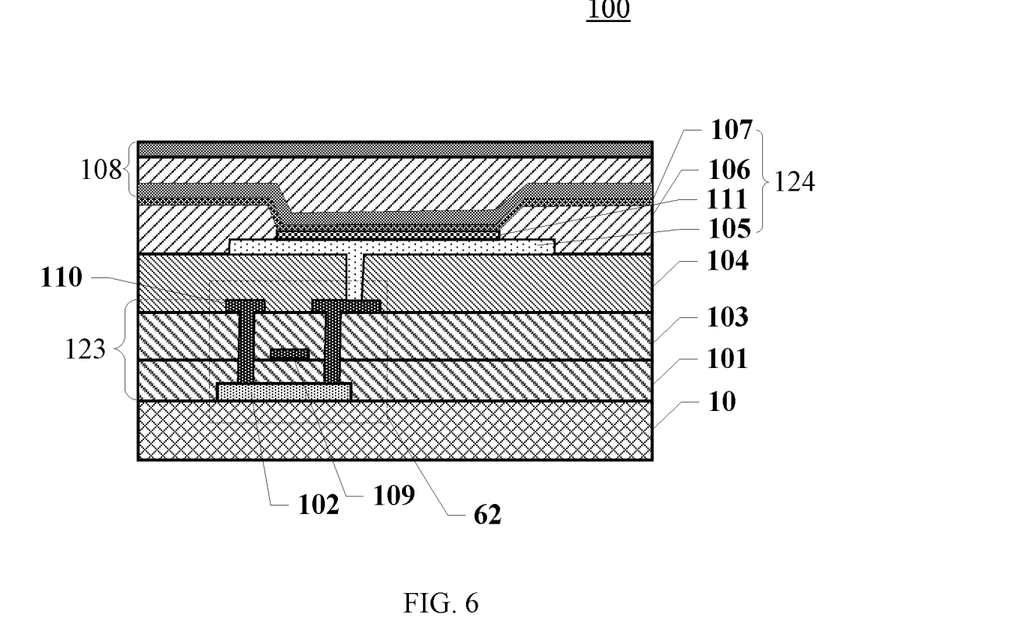
FIG. 6 illustrates a schematic cross-sectional view of a pixel region of the display panel shown in FIG. 2 along a C-C direction.

FIG. 6 illustrates a schematic cross-sectional view of a pixel region of the display panel shown in FIG. 2 in a C-C direction. Referring to FIG. 6, in one embodiment, the display panel may include a thin-film transistor array layer 123 and an organic light-emitting material layer 124 sequentially disposed on the base substrate 10. The thin-film transistor array layer 123 may include a gate metal layer 109 and a source/drain metal layer 110 stacked along a direction perpendicular to the base substrate 10. The organic light-emitting material layer 124 may include an anode layer 105, a pixel defining layer 106, an organic light-emitting material 111 and a cathode layer 107 sequentially disposed in the direction perpendicular to the base substrate 10.

In one embodiment, the thin-film transistor array layer 123 shown in FIG. 6 may include a plurality of driving thin-film transistors 62. The drain of each driving thin-film transistor 62 may be electrically connected to the anode layer 105 in the organic light-emitting material layer 124. According to the embodiment of the present disclosure, after the driving thin-film transistor 62 is turned on, holes and electrons are injected from the anode layer 105 and the cathode layer 107, respectively into the organic light-emitting material 111. The holes meet and recombine with the electrons in the organic light-emitting material 111, thus releasing energy. The energy is then transferred to the molecules of the organic light-emitting material in the organic light-emitting material 111 such that the molecules are able to transition from a ground state to an excited state. Because the excited state is unstable, the excited molecules return from the excited state to the ground state, and the radiation transition leads to a luminescence phenomenon. Based on the luminescence phenomenon, pictures may be displayed by organic light-emitting diodes. It should be noted that, in some embodiments of the present disclosure, a gate dielectric layer 101, a semiconductor active layer 102, a metal isolation layer 103 (for isolating the gate metal layer 109 and the source/drain metal layer 110), and a planarized layer 104 (for isolating the source/drain metal layer 110 and the anode layer 105) may be disposed on the base substrate 10, and an encapsulation layer 108 may be disposed on the side surface of the organic light-emitting material layer 124 away from the base substrate 10.

Figure 7:
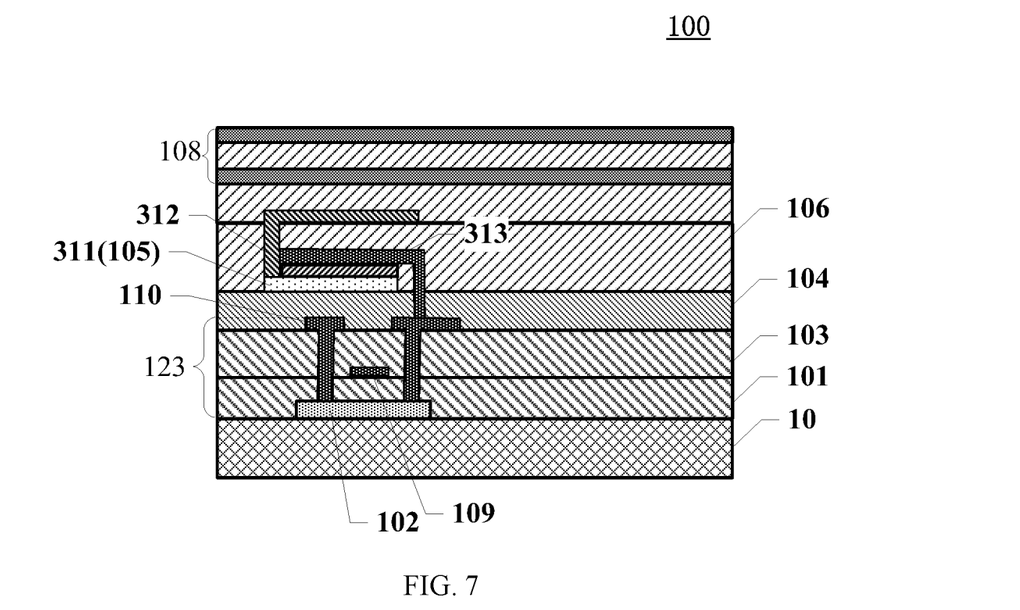
FIG. 7 illustrates another schematic cross-sectional view of a fingerprint recognition unit of the display panel shown in FIG. 2 along the A-A direction.

In one embodiment, the anode layer 105 according to the embodiment of the present disclosure shown in FIG. 6 may include a transparent electrode material, and the first electrode layer 311 of the fingerprint recognition sensor 31 may be disposed in a same layer as the anode layer 105. As an example, FIG. 7 illustrates another schematic cross-sectional view of the fingerprint recognition unit of the display panel shown in FIG. 2 along the A-A direction. Referring to FIG. 7, the first electrode layer 311 of the fingerprint recognition sensor 31 may be disposed in a same layer serve as the anode layer 105. In one embodiment, using a transparent electrode material to form the first electrode layer 311 of the fingerprint recognition sensor 31 may be more conducive to improving the utilization of the light and the fingerprint recognition sensitivity. Therefore, according to the embodiments of the present disclosure, when the anode layer 105 of the organic light-emitting material layer 124 is also made of a transparent electrode material, the first electrode layer 311 and the anode layer 105 may be disposed in a same layer. As such, the first electrode layer 311 and the anode layer 105 can be fabricated in a same manufacturing process, and an additional film structure may not need to be separately provided for the first electrode layer 311. The film-sharing design may be conducive to saving the production process of the display panel 100, and may thus improve the production efficiency. In the meantime, the film-sharing design may also be conducive to reducing the overall thickness of the display panel after introducing the fingerprint recognition units 30.

In one embodiment, besides the structure shown in FIG. 7, the fingerprint recognition sensor 31 may alternatively adopt the structure shown in FIG. 3. According to the embodiment illustrated in FIG. 3, the first electrode layer 311 of the fingerprint recognition sensor 31 may be located between the gate metal layer 109 and the anode layer 105. Referring to FIG. 3 and FIG. 6, the fingerprint recognition sensor 31 may sequentially include a first electrode layer 311, a PIN layer 312, and a second electrode layer 313. A capacitor may be formed between the second electrode layer 313 and an anode layer 105 disposed above the second electrode layer 313. The film layers of the fingerprint recognition sensor 31 may be integrated on the existing film structure of the display panel 100, and may be located between the pixel defining layer 106 and the metal isolation layer 103. By adopting the design, the thickness of the display panel 100 may also remain unaffected when introducing the fingerprint recognition units 30.

Figure 8:
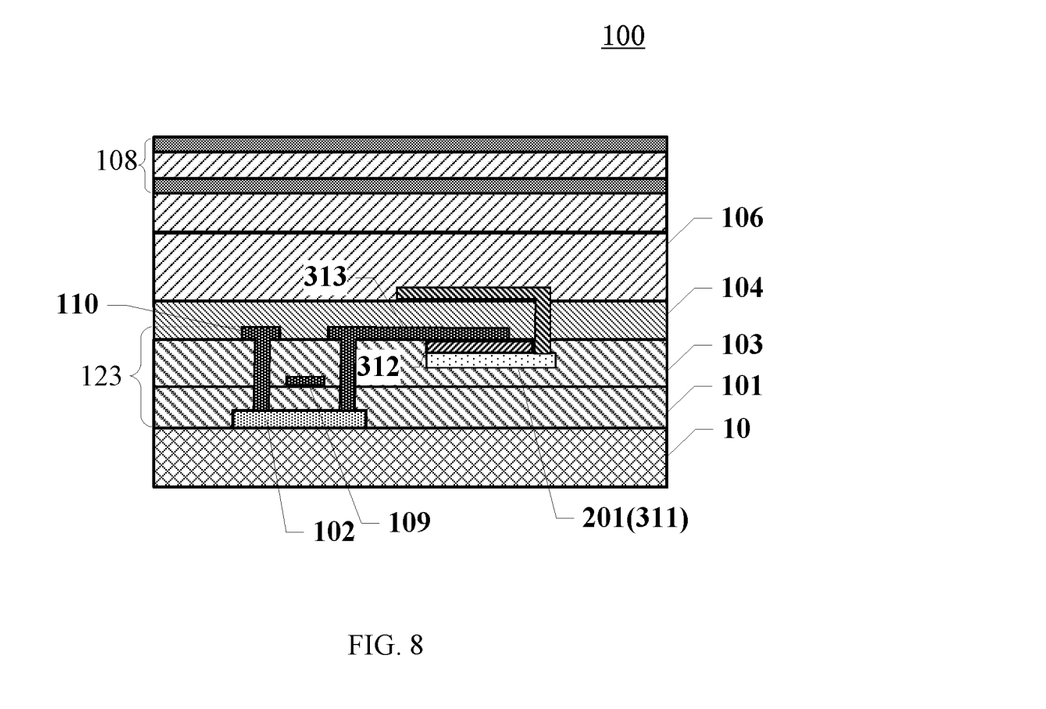
FIG. 8 illustrates another schematic cross-sectional view of a fingerprint recognition unit of the display panel shown in FIG. 2 along the A-A direction.

FIG. 8 illustrates another schematic cross-sectional view of the fingerprint recognition unit of the display panel shown in FIG. 2 along the A-A direction. Referring to FIG. 8, in one embodiment, the display panel 100 may also include a capacitor metal layer 201. The capacitor metal layer 201 may be disposed between the gate metal layer 109 and the source/drain metal layer 110. The capacitor metal layer 201 may include a transparent electrode material, and the first metal layer 311 and the capacitor metal layer 201 may be disposed in a same layer.

According to the embodiments of the present disclosure, because using a transparent electrode material to form the first electrode layer 311 of the fingerprint recognition sensor 31 may be conducive to improving the fingerprint recognition sensitivity, when the capacitor metal layer 201 is also made of a transparent material, the first electrode layer 311 and the capacitor metal layer 201 may be disposed in a same layer. As such, the first electrode layer 311 and the capacitor metal layer 201 can be fabricated in a same manufacturing process, and an additional film structure may not need to be separately provided for the first electrode layer 311. The film-sharing design may be conducive to saving the production process of the display panel 100, and may thus improve the production efficiency. In the meantime, the film-sharing design may also be conducive to reducing the overall thickness of the display panel after introducing the fingerprint recognition units 30.

Figure 9:
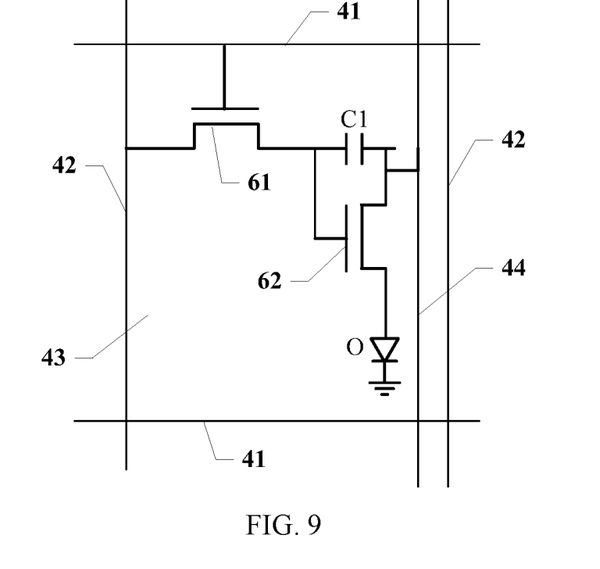
FIG. 9 illustrates a schematic diagram of a pixel driving circuit of a display panel according to some embodiments of the present disclosure.

FIG. 9 illustrates a schematic diagram of a pixel driving circuit of a display panel according to the embodiments of the present disclosure. In the following, the capacitor metal layer 201 shown in FIG. 8 will be briefly described with reference to FIG. 9.

Referring to FIG. 9, each pixel region 43 may be defined by two adjacent gate lines 41 and two adjacent data signal lines 42 with each data signal line 42 intersecting with both gate lines 41. The pixel region 43 may further include a power line 44 disposed in parallel with the data signal lines 42. The power line 44 may be electrically isolated from the data signal lines 42, and the power line 44 may be used to provide a supply voltage. Each pixel region 43 may include a switching thin-film transistor 61, a driving thin-film transistor 62, a storage capacitor C1, and an organic light-emitting diode O.

The gate of the switching thin-film transistor 61 may be electrically connected to a corresponding gate line 41, the source of the switching thin-film transistor 61 may be electrically connected to a corresponding data signal line 42, and the drain may be electrically connected to the gate of the driving thin-film transistor 62. The storage capacitor C1 may be disposed between the gate of the driving thin-film transistor 62 and the power line 44, and the power line 44 may provide the supply voltage to the organic light-emitting diode O.

When the gate signal applied through the gate line 41 causes the switching thin-film transistor 61 to be turned on, the data signal from the data signal line 42 may be applied to the gate of the driving thin-film transistor 62 and the storage capacitor C1. When the data signal causes the driving thin-film transistor 62 to be turned on, a current may be sent from the power line 44 to the organic light-emitting diode O, causing the organic light-emitting diode to emit light. In this case, when the driving thin-film transistor 62 is turned on, the level of the current sent from the power line 44 to the organic light-emitting diode O may be determined as a level that can cause the organic light-emitting diode O to generate a corresponding gradation. The storage capacitor C1 may be used to maintain the voltage of the gate of the driving thin-film transistor 62 when the switching thin-film transistor 61 is turned off. Therefore, even when the switching thin-film transistor 61 is turned off, the level of the current sent from the power line 44 to the organic light-emitting diode O can be maintained until the next frame. The capacitor metal layer 201 mentioned in the embodiments of the present disclosure may be the film layer where the storage capacitor C1 is located.

Referring to FIG. 5, according to the embodiments of the present disclosure, the base substrate 10 of the display panel 100 may include a transparent material, and the display panel 100 may include a thin-film transistor array layer 123 disposed on the base substrate 10. The thin-film transistor array layer 123 may include a plurality of oxide thin-film transistors. Because the fingerprint recognition region 12 is folded to the back-side surface of the display panel 100, before the light reflected by a touch object reaches the fingerprint recognition sensor 31, the light needs to pass through two layers of the base substrate 10. When the base substrate 10 is made of a transparent material, when the light reflected by the touch object passes through the base substrate 10, the amount of loss may be small. Therefore, the design may be conducive to further improving the utilization of the light and the fingerprint recognition sensitivity. When the base substrate 10 is made of a transparent material, the transparent material may be a transparent polyimide (PI). Because the transparent PI may not be resistant to high temperature, the thin-film transistor array layer 123 formed on the transparent PI may include oxide thin-film transistors that have a low preparation temperature. One of the most prominent features of oxide thin-film transistors is that the oxide thin-film transistors can be prepared at room temperature, and preparation at such a low temperature may not affect the performance of the transparent PI. The channel layer of the oxide thin-film transistor may be made of one or more of ZnO, Zn—Sn—O, MgZnO, In—Ga—O, $In_2O_3$, etc. The preparation of these materials may be carried out by methods such as magnetron sputtering, pulsed lase deposition, electron beam evaporation, etc.

Figure 10:
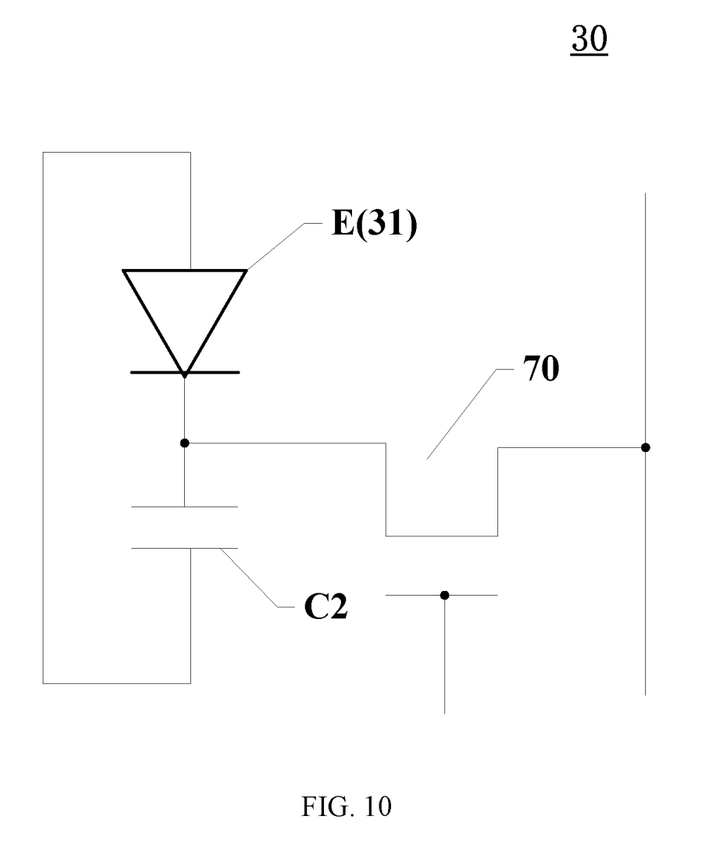
FIG. 10 illustrates an equivalent circuit diagram of a fingerprint recognition unit according to some embodiments of the present disclosure.

FIG. 10 illustrates an equivalent circuit diagram of a fingerprint recognition unit according to some embodiments of the present disclosure. Referring to FIG. 10, in one embodiment, the fingerprint recognition unit 30 may also include a fingerprint recognition driving circuit and a storage capacitor C2. The fingerprint recognition driving circuit may at least include a first thin-film transistor 70. The first thin-film transistor 70 may be disposed in the thin-film transistor array layer 123.

In one embodiment, the fingerprint recognition sensor 31 included in the fingerprint recognition unit 30 may be a photodiode E. Besides the photodiode E, the fingerprint recognition unit 30 may further include a storage capacitor C2 and a thin-film transistor 70. The anode of the photodiode E may be electrically connected to a first electrode of the storage capacitor C2, and the cathode of the photodiode E may be electrically connected to a second electrode of the storage capacitor C2 and the source of the thin-film transistor 70. The photodiode E may operate under a reverse voltage. The reverse current may be extremely weak when not receiving the light reflected by the touch object, and the reverse current may rapidly increase upon receiving the light reflected by the touch object. The greater the intensity of the light reflected by the touch object, the greater the reverse current of the photodiode E. The change in the light may cause a change in the current in the fingerprint recognition sensor 31, such that the optical signal can be converted into an electrical signal, and thus realize the fingerprint recognition function.

In one embodiment, referring to FIG. 4, after the display panel 100 is folded at the step bending region 11, the orthogonal projection of the fingerprint recognition region 12 on the display panel 100 may be located in the display region 121. By adopting the design, the fingerprint recognition region 12 may not occupy any space of the non-display region 122 in the frame region of the display panel 100, which may be conducive to implementing the narrow frame design. In addition, when the orthogonal projection of the fingerprint recognition region 12 on the display panel 100 is located in the display region 121, the light emitted by the pixel array 20 in the display region 121 may be used as the light source for fingerprint recognition. As such, a separate light source may not be required for the fingerprint recognition unit 30, which may be conducive to saving production processes and production costs.

Figure 11:
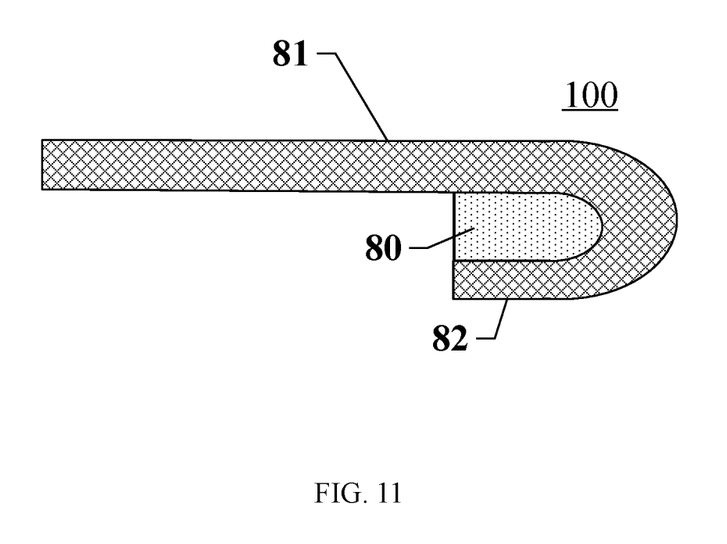
FIG. 11 illustrates a schematic cross-sectional view of an exemplary display panel after being folded according to some embodiments of the present disclosure.

FIG. 11 illustrates a schematic cross-sectional view of an exemplary display panel after being folded according to some embodiments of the present disclosure. Referring to FIG. 11, in one embodiment, after the display panel 100 is folded at the step bending region 11, the step bending region 11 may divide the display panel 100 into a front surface region 81 and a back surface region 82. The base substrate 10 located in the back surface region 82 and the base substrate 10 located in the front surface region 81 may be bonded together by an optical adhesive 80. The optical adhesive 80 may be an optically clear adhesive (OCA). The OCA is a layer of special non-substrate-based double-sided adhesive with optical transparency and has high light transmittance (the total light transmittance is greater than 99%), high adhesion, and high water resistance. In a display panel according to the embodiments of the present disclosure, when an OCA is adopted, the use of the OCA may not only ensure that the light reflected by the touch object can pass through the OCA without any loss or with limited loss, but also ensure that the base substrate 10 in the back surface region 82 will not be detached from the base substrate 10 in the front surface region 81 when the display panel 100 is used for a long time.

It should be noted that, according to the embodiments of the present disclosure, a driving chip may be further disposed in the display panel. The driving chip may be electrically connected to the pixel array and the fingerprint recognition unit, respectively. The driving chip may be located in the portion of the non-display region between the step bending region and the display region. Alternatively, the driving chip may be located at the side of the step bending region that is away from the display region, or at any other appropriate position of the display panel.

Figure 12:
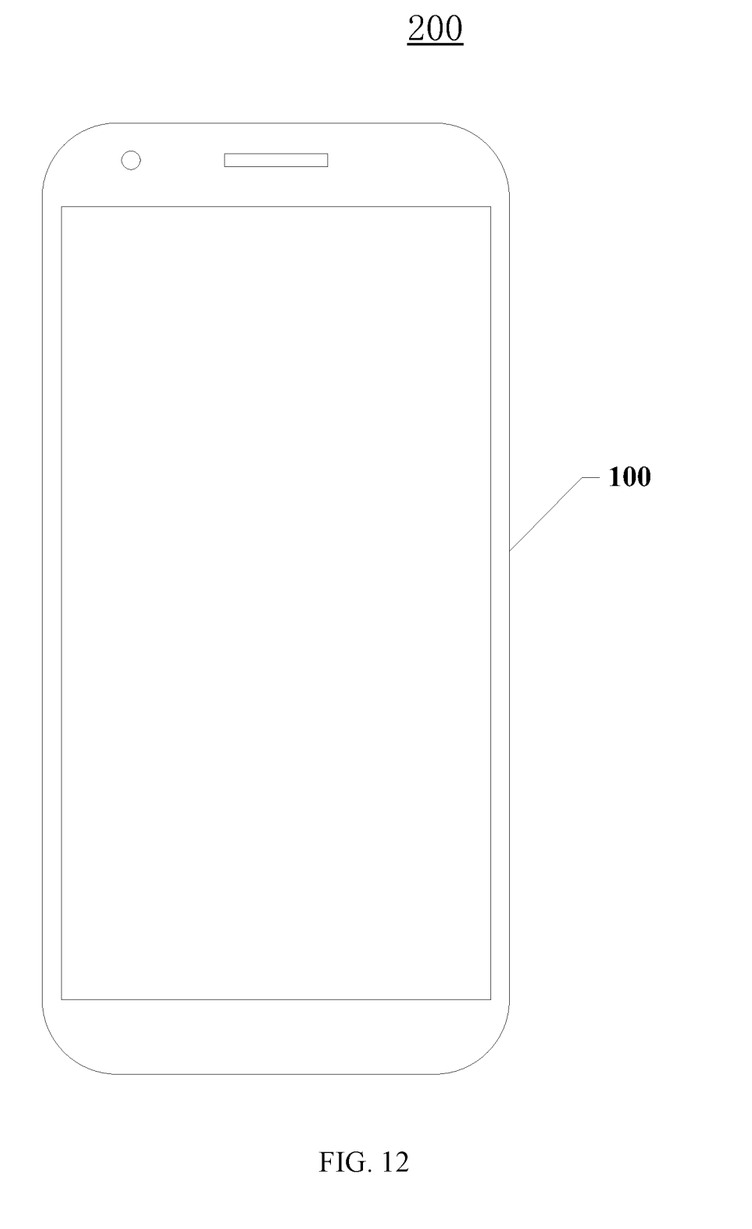
FIG. 12 illustrates a schematic diagram of a display device according to some embodiments of the present disclosure.

Further, the present disclosure also provides a display device based on the same concept of the disclosed display panel described above. FIG. 12 illustrates a schematic diagram of a display device according to some embodiments of the present disclosure.

Referring to FIG. 12, the display device may include a display panel 100 consistent with the embodiments of the present disclosure. It should be noted that the disclosed display device may be any product or component having a display function, such as a mobile phone, a tablet computer, a television, a monitor, a notebook computer, a digital photo frame, a navigator, etc. For the embodiments of the disclosed display device, reference may be made to the embodiments of the display panel provided above, and the details are not described herein again.

Compared to conventional display panels and display devices with fingerprint recognition functions, the disclosed display panel and display device demonstrate the following advantages.

According to the disclosed display panel and display device, the display panel and the display device include a pixel array and at least one fingerprint recognition unit. The fingerprint recognition unit and the pixel array share a same base substrate. The fingerprint recognition unit is integrated into the relevant film structures formed on the base substrate, and thus separately setting a corresponding module for the fingerprint recognition unit may not be necessary. Therefore, while the display panel and the display device have the fingerprint recognition functions, the number of components included in the display panel and the display device may be reduced, which may be conducive to reducing the production cost and the weight of the display panel and the display device. In addition, in practical applications. The fingerprint recognition unit is folded to the side surface of the display panel facing away from the light-emitting surface, and thus may be conducive to reducing the frame width of the display panel and the display device. As such, the narrow frame design may be implemented. Further, the material used for making the first electrode layer of the fingerprint recognition unit is designed as a transparent electrode material such that it may be easier for the fingerprint recognition unit to receive optical signals. Therefore, using a transparent electrode material to form the first electrode layer may be conducive to improving the fingerprint recognition sensitivity and the fingerprint recognition efficiency.

The above detailed descriptions only illustrate certain exemplary embodiments of the present disclosure, and are not intended to limit the scope of the present disclosure. Those skilled in the art can understand the specification as whole and technical features in the various embodiments can be combined into other embodiments understandable to those persons of ordinary skill in the art. Any equivalent or modification thereof, without departing from the spirit and principle of the present disclosure, falls within the true scope of the present disclosure.

What is claimed is:

1. A display panel, comprising:
   a base substrate, including a display region and a non-display region;
   a pixel array, disposed in the display region; and at least one fingerprint recognition unit, located in the non-display region and sharing the base substrate with the pixel array, wherein:

each fingerprint recognition unit includes a fingerprint recognition sensor, wherein the fingerprint recognition sensor includes a first electrode layer, a P-type-semiconductor/insulator/N-type-semiconductor (PIN) layer, and a second electrode layer disposed in a sequential order, and the first electrode layer includes a transparent electrode material, the non-display region includes a step bending region and a fingerprint recognition region, wherein the fingerprint recognition region is located on a side of the step bending region away from the display region, and the at least one fingerprint recognition unit is located in the fingerprint recognition region, and the display panel is folded at the step bending region, wherein after the display panel is folded, the first electrode layer of each fingerprint recognition unit is located on a side surface of the PIN layer close to a light-emitting surface of the display panel, and a folding direction of the display panel is opposite to a light-emitting direction of the display panel.

2. The display panel according to claim 1, wherein:
a thickness of the first electrode layer is in a range of approximately 100 nm to 200 nm.

3. The display panel according to claim 1, wherein:
the first electrode layer includes indium tin oxide.

4. The display panel according to claim 1, further including a thin-film transistor array layer and an organic light-emitting material layer sequentially disposed on the base substrate, wherein:

the thin-film transistor array layer includes a gate metal layer and a source/drain metal layer stacked along a direction perpendicular to the base substrate; and the organic light-emitting material layer includes an anode layer, a pixel defining layer, an organic light emitting material layer, and a cathode layer sequentially disposed in the direction perpendicular to the base substrate.

5. The display panel according to claim 4, wherein:
the anode layer includes a transparent electrode material disposed in a same layer as the first electrode layer.

6. The display panel according to claim 4, wherein:
the fingerprint recognition unit further includes a fingerprint recognition driving circuit and a storage capacitor, wherein the fingerprint recognition driving circuit at least includes a first thin-film transistor, and the first thin-film transistor is disposed in the thin-film transistor array layer.

7. The display panel according to claim 4, wherein:
the first electrode layer is located between the gate metal layer and the anode layer.

8. The display panel according to claim 4 further including a capacitor metal layer, wherein:

the capacitor metal layer is located between the gate metal layer and the source/drain metal layer;

the capacitor metal layer includes a transparent electrode material; and the capacitor metal layer is disposed in a same layer as the first electrode layer.

9. The display panel according to claim 1, wherein:
the base substrate includes a transparent material; and
the display panel includes a thin-film transistor array layer disposed on the base substrate, wherein the thin-film transistor array layer includes a plurality of oxide thin-film transistors.

10. The display panel according to claim 9, wherein:
the fingerprint recognition unit further includes a fingerprint recognition driving circuit and a storage capacitor, wherein the fingerprint recognition driving circuit at least includes a first thin-film transistor, and the first thin-film transistor is disposed in the thin-film transistor array layer.

11. The display panel according to claim 9, wherein:
the base substrate is made of a transparent polyimide (PI); and
the plurality of oxide thin-film transistors include channel layers made of one or more of ZnO, Zn—Sn—O, In—Zn—O, MgZnO, In—Ga—O, and $In_2O_3$.

12. The display panel according to claim 1, wherein:
after the display panel is folded at the step bending region, the step bending region divides the display panel into a front surface region and a back surface region, and the base substrate located in the back surface region is bonded to the base substrate located in the front surface region through an optical adhesive.

13. The display panel according to claim 12, wherein:
the optical adhesive is an optically clear adhesive with a total light transmittance greater than 99%.

14. A display device, comprising:
a display panel, including:
a base substrate, including a display region and a non-display region;
a pixel array, disposed in the display region; and
at least one fingerprint recognition unit, located in the non-display region and sharing the base substrate with the pixel array, wherein:

each fingerprint recognition unit includes a fingerprint recognition sensor, wherein the fingerprint recognition sensor includes a first electrode layer, a PIN layer, and a second electrode layer disposed in a sequential order, and the first electrode layer includes a transparent electrode material, the non-display region includes a step bending region and a fingerprint recognition region, wherein the fingerprint recognition region is located on a side of the step bending region away from the display region, and the at least one fingerprint recognition unit is located in the fingerprint recognition region, and the display panel is folded at the step bending region, wherein after the display panel is folded, the first electrode layer of each fingerprint recognition unit is located on a side surface of the PIN layer close to a light-emitting surface of the display panel, and a folding direction of the display panel is opposite to a light-emitting direction of the display panel.

15. The display device according to claim 14, wherein:
a thickness of the first electrode layer is in a range of approximately 100 nm to 200 nm.

16. The display device according to claim 14, wherein:
the first electrode layer includes indium tin oxide.

17. The display device according to claim 14, wherein the display panel further includes a thin-film transistor array layer and an organic light-emitting material layer sequentially disposed on the base substrate, wherein:

the thin-film transistor array layer includes a gate metal layer and a source/drain metal layer stacked along a direction perpendicular to the base substrate; and the organic light-emitting material layer includes an anode layer, a pixel defining layer, an organic light-emitting material, and a cathode layer sequentially disposed in the direction perpendicular to the base substrate.

18. The display device according to claim 17, wherein:

the anode layer includes a transparent electrode material disposed in a same layer as the first electrode layer.

19. The display device according to claim 17, wherein:

the first electrode layer is located between the gate metal layer and the anode layer.

20. The display device according to claim 14, wherein:

the base substrate includes a transparent material; and the display panel includes a thin-film transistor array layer disposed on the base substrate, wherein the thin-film transistor array layer includes a plurality of oxide thin-film transistors.

* * * * *